United States Patent [19]

Makh et al.

[11] Patent Number: 4,917,476

[45] Date of Patent: Apr. 17, 1990

[54] THERMAL IMAGERS USING LIQUID CRYSTAL SENSING ELEMENTS

[75] Inventors: Surinder S. Makh; Alan D. Hart; David L. Tunnicliffe, all of Bristol, United Kingdom

[73] Assignee: British Aerospace Public Limited Company, Bristol, England

[21] Appl. No.: 168,557

[22] Filed: Mar. 4, 1988

Related U.S. Application Data

[63] Continuation of Ser. No. 876,483, Jun. 20, 1986, abandoned.

[30] Foreign Application Priority Data

Jun. 21, 1985 [GB] United Kingdom ................. 8515789
Aug. 21, 1985 [GB] United Kingdom ................. 8520913

[51] Int. Cl.$^4$ ................................................ G02F 1/13
[52] U.S. Cl. ............................... 350/351; 350/347 R; 350/338; 250/331
[58] Field of Search .............. 350/334, 351, 347 E, 350/339 R, 163, 164, 347 R, 315, 318, 338; 356/352; 250/331

[56] References Cited

U.S. PATENT DOCUMENTS

| | | | |
|---|---|---|---|
| 3,114,836 | 12/1963 | Fergason et al. | 250/250 |
| 3,259,015 | 7/1966 | Marcatili | 350/385 |
| 3,325,646 | 6/1967 | Reichel et al. | 350/355 |
| 3,492,478 | 1/1970 | Smith | 350/315 |
| 3,516,727 | 6/1970 | Hickey et al. | 350/356 |
| 3,551,028 | 12/1970 | Ploss | 350/356 |
| 3,569,709 | 3/1971 | Wank | 250/83.3 |
| 3,694,053 | 9/1972 | Kahn | 350/347 R |
| 3,723,346 | 3/1973 | Taylor et al. | 252/408.1 |
| 3,802,760 | 4/1974 | Sosnowski | 350/96.13 |
| 3,833,287 | 9/1974 | Taylor et al. | 350/249 |
| 4,148,951 | 4/1979 | Clark, III | 428/1 |
| 4,239,345 | 12/1980 | Berreman | 350/331 R |
| 4,240,712 | 12/1980 | Thirant | 350/331 |
| 4,315,258 | 2/1982 | McKnight et al. | 350/338 |
| 4,333,708 | 6/1982 | Boyd et al. | 350/346 |
| 4,367,924 | 1/1983 | Clark et al. | 350/334 |
| 4,391,492 | 7/1983 | Lu et al. | 350/351 |
| 4,408,839 | 10/1983 | Wiener | 350/347 R |
| 4,594,507 | 6/1986 | Elliott et al. | 250/331 |
| 4,670,654 | 6/1987 | Ross | 250/331 |
| 4,740,059 | 4/1988 | Boldt | 350/318 |

FOREIGN PATENT DOCUMENTS

| | | |
|---|---|---|
| 0065397 | 11/1982 | European Pat. Off. . |
| 1119253 | 7/1968 | United Kingdom . |
| 1350515 | 4/1974 | United Kingdom . |
| 1376611 | 12/1974 | United Kingdom . |
| 1387276 | 3/1975 | United Kingdom . |
| 1438817 | 6/1976 | United Kingdom . |
| 1442802 | 7/1976 | United Kingdom . |
| 1522065 | 8/1978 | United Kingdom . |
| 2123163 | 1/1984 | United Kingdom . |
| 2125573 | 3/1984 | United Kingdom . |
| 2125982 | 3/1984 | United Kingdom . |
| 2152690 | 8/1985 | United Kingdom . |
| 2163566 | 2/1986 | United Kingdom . |

OTHER PUBLICATIONS

European Search Report, EP 86 30 4745, dated 9/11/88; Exr. Van Den Bulcke E.

Primary Examiner—Stanley D. Miller
Assistant Examiner—Trong Quang Phan
Attorney, Agent, or Firm—Cushman, Darby & Cushman

[57] ABSTRACT

It is known to use liquid crystal cells for thermal imaging. However, the sensitivity of the liquid crystal cell is reduced due to the walls of the cell absorbing some of the incident radiation and locally heating the crystal thereby producing localized changes in phase. Liquid crystal materials which have sufficient surface tension to form a film without forming a part of a cell are disclosed where the pitch of the helix of the film exhibits a strong temperature dependence. In one embodiment the liquid crystal film is mounted wtihin a Fabry-Perot resonant cavity so that detection of the change in the crystal due to a change in temperature is enhanced.

21 Claims, 2 Drawing Sheets

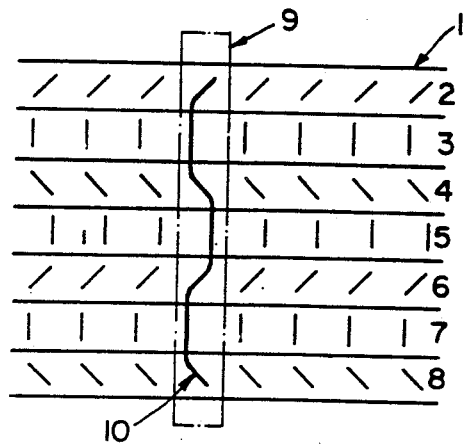
Fig.1.
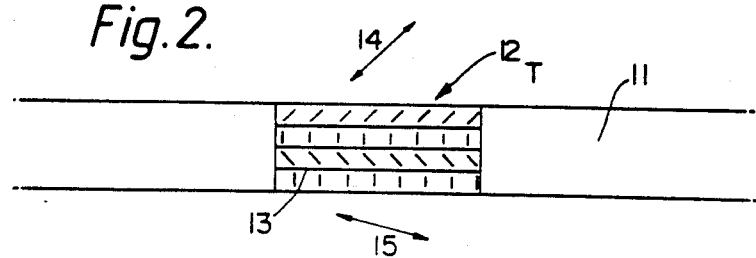
Fig.2.
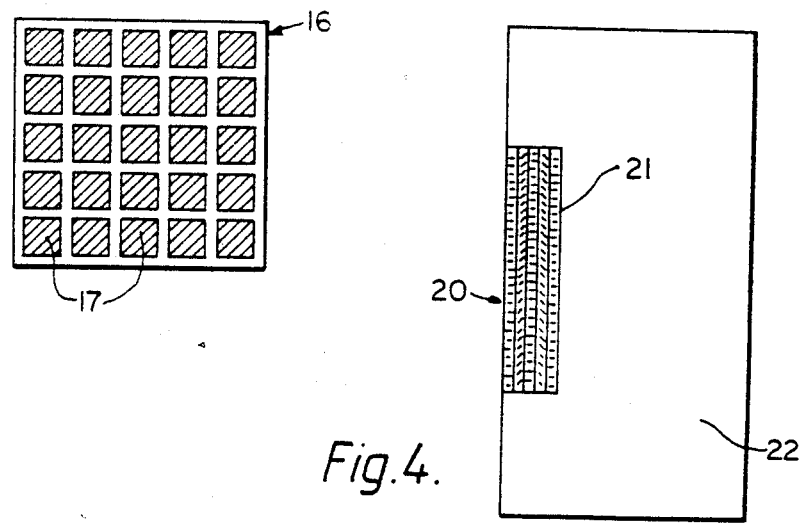
Fig.3.
Fig.4.

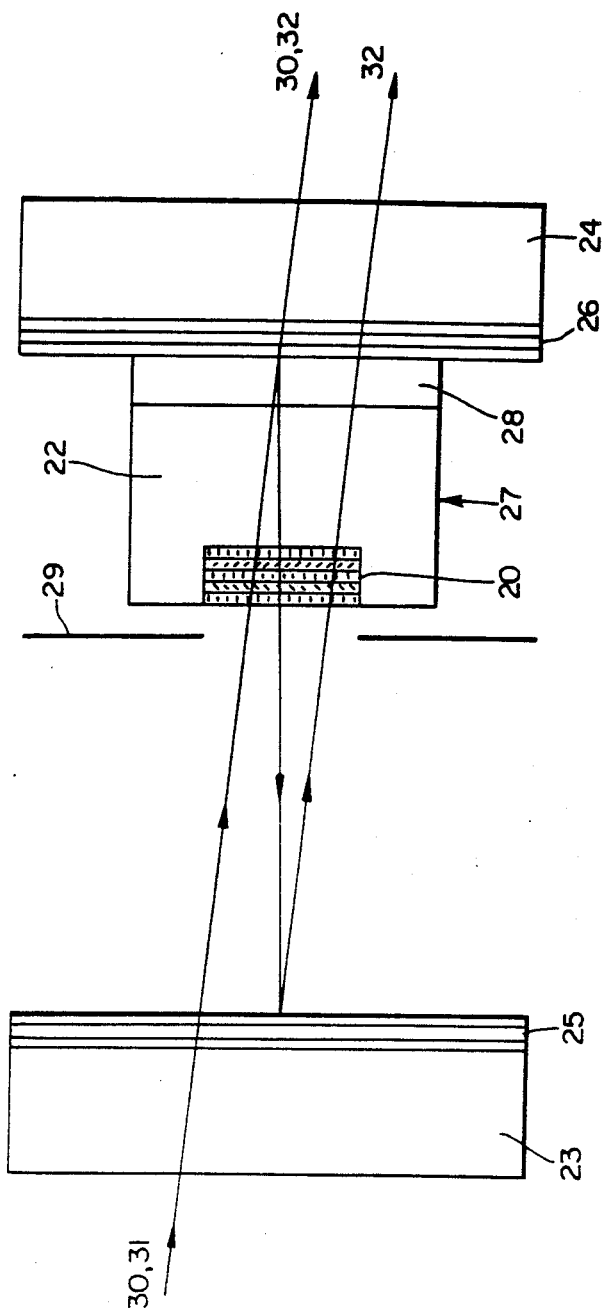

THERMAL IMAGERS USING LIQUID CRYSTAL SENSING ELEMENTS

This is a continuation of application Ser. No. 876,483, filed June 20, 1986, which was abaondoned upon the filing hereof.

BACKGROUND OF THE INVENTION

This invention relates to thermalimagers which use liquid crystals as the sensing elements.

It is known to use liquid crystal cells for thermal imaging. The crystals are contained by transparent plates which form the walls of the cell. In use, the liquid crystal is held at its cholesteric-isotropic phase transition temperature. At this temperature the crystal has a large temperature coefficient of optical rotatory power. When infra-red radiation falls on the crystal held at this temperature, it alters the crystal temperature locally, producing changes in phase within the crystal, ie from cholesteric to isotropic. These changes can be measured using a scanning polarimeter which gives an output electronic signal which is proportional to the incident infra-red radiation. However, the sensitivity of the liquid crystal cell is reduced due to the walls of the cell absorbing some of the incident radiation and locally heating the crystal. Problems with the flow of the liquid crystal may also occur due to the localized changes in phase caused by this local heating. Impurities on the internal walls of the cell may act as centres of nucleation, ie points onto which the crystals may attach themselves and produce undesirable molecular orientation effects.

Free-standing chiral smectic C liquid crystal films, having thicknesses between 10 to 100 molecules (500–5,000 Å), are known to exhibit a strong temperature dependence in which the pitch of the helix alters with temperature. The term "free-standing" is applied to a liquid crystal film and is used to define those liquid crystal materials which have sufficient surface tension to form a film without the necessity of containment plates.

SUMMARY OF THE INVENTION

According to one aspect of the invention, there is provided a thermal imager in which the sensitive element includes such a free-standing liquid crystal film. Naturally, the film has to be supported and this may be affected by an apertured plate or frame. The liquid crystal film may be a smectic liquid crystal film which is sensitive to infra-red radiation and which is positioned so that infra-red radiation emanating from a predetermined field of view impinges on the film to create a thermal image wherein at least one major surface of the liquid crystal film is unsupported. Preferably, the imaging device is arranged so that incident infra-red radiation impinges on the at least one unsupported major surface of the liquid crystal film.

The thermal imager also includes means for directing the incident radiation onto the film, and readout means for reading out optical image of a thermal image formed on the film.

Preferably, the readout means is a polarised light system with polarisation sensitive image forming means.

Preferably, the imaging device also comprises means for causing a read beam to pass through the liquid crystal film several times so as to enhance the image obtained. The enhancement means may comprises first and second members which are at least partially reflective, one member being mounted on each side of the liquid crystal film.

According to a second aspect of the invention, there is provided a thermal imaging system comprising:
support means made of heat-retaining material;
a liquid crystal film element mounted within the support means but having a surface exposed, the film element being sensitive to infra-red radiation incident on the surface; and
detector means arranged to detect changes in the film element due to the incident radiation;
the support means being operable for retaining at least a part of the incident radiation for a given period of time.

Advantageously, the film element is mounted within a shallow recess in a block of thermally insulating material. However, the imaging device according to the present invention may also comprise a liquid crystal film of which both of the major surfaces are unsupported. To increase the surface area of the infra-red sensitive liquid crystal film, for example, the imaging device may comprise a reticulated structure supporting a plurality of such films.

Naturally, the detector means includes illumination means for illuminating the film element with a visible light beam to detect the changes, and the heat-retaining material is transmissive to visible light. Preferably, the film element and support means are positioned between first and second partially reflective members to enhance the change in the light beam.

According to a third aspect of the invention, there is provided an infra-red radiation transducer comprising a support member which is made of heat-retaining material and which has portions defining the base and sides of a shallow well open at one surface of the member, a film of heat-sensitive liquid crystal material contained in and supported by the base and sides of the well, infra-red radiation receiving means for receiving infra-red radiation and directing it onto the surface of the film which is exposed at the one surface of the member, and visible radiation beam producing means for directing a beam of visible electromagnetic radiation through the film and the member, the heat-retaining material being transmissive of the visible radiation beam and the heat-sensitive film being operable to modulate the visible radiation beam in dependence upon the temperature of the film.

BRIEF DESCRIPTION OF THE DRAWINGS

For a better understanding of the invention, reference will now be made, by way of example, to the accompanying drawings, in which:

FIG. 1 is a schematic diagram of a chiral smectic C liquid crystal;

FIG. 2 is a schematic diagram of a thermal imager comprising a free-standing smectic liquid crystal film mounted on its support member;

FIG. 3 is a schematic diagram showing a reticulated smectic liquid crystal imager;

FIG. 4 is a schematic diagram of a thermal imager comprising a smectic liquid crystal film mounted in an insulating block; and FIG. 5 is a schematic diagram of the FIG. 4 imager mounted in a Fabry-Perot resonant cavity.

DETAILED DESCRIPTION OF THE PREFERRED EMBODIMENTS

The smectic structure of a liquid crystal is divided into two groups: structure A and structure C. In both groups, the molecules are long and thin, and form layers with their long axes across the layers. The smectic A structure has the molecules aligned with their axes normal to the layers, whereas the smectic C structure has the molecules tilted away from the layer normal at some tilt angle, but in both cases the molecules within a layer lie parallel to one another. The molecular forces between layers are relatively small but the forces with each layer can be quite large.

If an optically active compound or similar dopant is added to smectic C structure, the liquid crystal structure is modified to give chiral smectic C structure in which the molecules are still parallel to each other in each layer, but in passing from one layer to the next, the molecular axis is rotated or twisted.

In FIG. 1, a liquid crystal 1 having the chiral smectic C structure is shown. The crystal 1 comprises several molecular layers (only seven of which, numbered 2 to 8, are shown). The molecules in each layer are shown as short lines—these lines also represent the molecular orientation within the layers. If a column, such as 9, is taken through the crystal structure, a 'helix' 10 can be seen which is made up from the rotation of the molecular orientation when passing from one layer to another a characteristic of this liquid crystal structure. The pitch of the helix 10 is strongly temperature dependent and will change when the temperature is altered due to the rotation of the molecules in the helix as they absorb energy. This change in the pitch of the helix changes the optical activity of the crystal 1, and this can be monitored to form an optical image corresponding to the thermal image formed on the crystal.

The thermal imager shown in FIG. 2 comprises a support member 11 having a hole 12 formed in it. A suitable smectic liquid crystal film 13 (of the sort described above) is stretched over the hole 12. The size of the hole 12 is chosen such that the surface tension of the film 13 is large enough to allow the film to be stretched over the hole in this manner. The support member 11 and the film 13 are maintained at a reference temperature T, and polarised light 14 is passed through the film 13. The light 15 leaving the film 13 has different optical properties due to the optical effect of the liquid crystal film 13 on the incident polarised light 14 at the reference temperature T. When an infra-red image is impressed onto the film 13, the molecules in the film rotate altering the pitch of each helix (as mentioned previously). These changes in the crystal modulate the incident polarised light 14 to give a visual image corresponding to the thermal or infra-red image impressed on the film 13. The imager shown is thought to work only while the liquid crystal film stays in its appropriate smectic phase and this may limit the scene temperature range which can be imaged in this way.

The largest size of film area over which a thermal image may be impressed (having the required thickness) is determined by surface tension effects as the film is pulled across the hole in its isotropic state. A reticulated structure 16 comprising several liquid crystal films 17, as shown in FIG. 3, may be used to provide a larger film area than is possible with one aperture or hole. The effects of reticulation can be removed during the optical processing of the image.

However, thermal imagers of this type are required to have a response time which is less than 50 ms and a sensitivity which enables temperature changes of less than 1K in the scene to be detected. In order to meet the required response time, a film thickness of 0.1 m is needed. This however produces the problem that the change in the read beam may not be large enough to be detectable after it has passed through the film. This may be overcome by the imager shown in FIG. 4.

The imager shown in FIG. 4 comprises a smectic liquid crystal film 20 mounted in a hole 21 formed in a block 22 of insulating material. The hole 21 is between 6 to 10 mm deep ie the film is 60 to 100 times thicker than that for a free-standing film relying on surface tension effect, and retains the film 20 in a preferred molecular orientation. The insulating block 22 is transparent to radiation in the visible portion of the electromagnetic spectrum, thereby allowing a read beam (not shown) of polarised light from a helium-neon laser to pass through it, and has the purpose of retaining incident infra-red radiation so that the properties of the film can change in response to the incident radiation. The read beam is plane-polarised and emerges from the film 20 elliptically-polarized in response to the temperature change sensed by the film 20. However, this arrangement again has the disadvantage that the read beam may not change sufficiently to enable the temperature change due to the incident radiation to be detected as the beam only passes through the film once. In order to overcome this, the imager may be mounted in Fabry-Perot resonant cavity as shown in FIG. 5.

The resonant cavity shown in FIG. 5 comprises a pair of substrates 23, 24 on which are deposited dielectric mirrors 25, 26 respectively. The substrate 23 is required to transmit both infra-red and visible radiation, and substrate 24 must transmit at least visible radiation. If required, each substrate 23, 24 may be made of a different material than the other. The mirrors 25, 26 are partially-reflective and partially-transmissive having a reflectivity, R, of about 94–95%. A thermal imager 27 (as described previously) is mounted in the cavity between the mirrors 25, 26 adjacent a compensator 28 which is in contact with the mirror 26. The compensator 28 nulls out the natural birefringence of the film 20 and the insulator 22 when the imager is in the OFF state, ie a dark background is obtained if the cavity is detuned or a light background if the cavity is tuned under ambient conditions. An iris 29 is positioned in front of the imager 27 so that the read beam only passes through the active region, ie the film 20 of the imager.

In operation, the incident infra-red radiation 30 and the read beam 31 are both incident on the substrate 23 and pass through it and the mirror 25 onto the film 20. The infra-red beam 30 passes into the insulator 22 and exits the cavity via compensator 28, mirror 26 and substrate 24. The read beam 31 also passes through the film 20, insulator 22 and compensator 28, but is partially reflected at the mirror 26 and is directed back through the imager 27 to mirror 25 where it is again partially reflected. The beam 31 passes across the cavity many times but only two reflections are shown in the Figure for clarity. The non-reflected parts of the beam 31, ie the transmitted portions 32, pass through the mirror 26 and substrate 24 and are summed to produce a representation of the image which is stored on the film 20 at that time. As mentioned previously, in the OFF state, the background is either dark or light depending on whether the cavity is detuned or tuned. The image stored on the film 20, then acts either to tune or detune the cavity, ie the representation containing the image is either a dark background containing a light image or a light background containing a dark image.

The polarization changes observed are from linear to elliptical and back again, ie the film 20 changes the plane-polarised beam into an elliptically polarised beam when the beam is passing from left to right and vice versa.

The substrates 23, 24 may be made of a material IR-TAN-2 and the dielectric mirrors 25, 26 may be made from zinc sulphide and cryolite deposited on the substrates.

The obtained enhancement of the read beam 31 is related to the mirror reflectivity R, ie the enhancement is $(1+R)/(1-R)$. However, this enhancement has to be offset against the amount of radiation absorbed in the substrate 23 and mirror 25.

The response time of the imager 27 when mounted in a Fabry-Perot resonant cavity depends on the thickness of the insulator 22 behind the film 20 and the heat sinking properties of the compensator 28.

Naturally, the passage of beam 31 through the imager 27 in FIG. 5 has been exaggerated to show multiple reflections at the dielectric mirrors 25, 26 but in effect these paths overlap, that is, the beams 30, 31 are both incident on the imager 27, and hence the mirrors 25, 26 normally.

In the embodiments described in FIGS. 4 and 5, a single liquid crystal film has been used. It is, of course, possible to use a reticulated structure as previously disclosed in which separate imagers 27 are positioned in an array with the appropriate thermal isolation being provided between each imager.

Ferroelectricity (or other smectic effects) may also be used to sense changes in temperature, and an appropriate readout system may be used to obtain the image.

We claim:

1. A thermal imaging system comprising:
   support means made of heat-retaining material;
   a liquid crystal film element mounted within said support means but having a surface exposed, said liquid crystal film element being sensitive to infra-red radiation incident on said surface from a remote source; and
   detector means arranged to detect changes in said liquid crystal film element due to said incident infra-red radiation from said remote source, said support means being operable for retaining at least a part of said incident infra-red radiation from said remote source for a given period of time.

2. A system according to claim 1, wherein liquid crystal film element is mounted within a shallow well formed in said support means.

3. A system according to claim 1, wherein said detector means includes illumination means for illuminating said liquid crystal film element with a visible light beam to detect said changes, and wherein said heat-retaining material is transmissive to visible light.

4. A system according to claim 3, wherein said visible light is linearly polarized.

5. A system according to claim 3, wherein said liquid crystal film element and support means are positioned between first and second partially reflective members to enhance the change in said visible light beam.

6. A system according to claim 5, wherein said first and second partially reflective members are dielectric mirrors formed on respective substrate elements, the mirrors and substrate elements being at least partially transmissive to infra-red radiation.

7. A system according to claim 5, wherein said support means is positioned adjacent compensator means which is operable to null out the natural birefringence of said liquid crystal element, said compensator means being in contact with said second partially reflective member.

8. A system according to claim 3, wherein said detector means further includes an iris for ensuring that said visible light is only incident on said liquid crystal film element.

9. An infra-red radiation transducer comprising a support member which is made of heat-retaining material and which has portions defining the base and sides of a shallow well open at one surface of the support member, a film of heat-sensitive liquid crystal material contained in and supported by the base and sides of said well, infra-red radiation being directed onto the surface of said heat-sensitive film, which is exposed at said one surface of the support member, and a beam of visible electromagnetic radiation being directed through said heat-sensitive film and said support member, said heat-retaining material being transmissive of said visible radiation beam and said heat-sensitive film being operable to modulate the visible radiation beam in dependence upon the temperature of the heat-sensitive film.

10. A thermal imaging device comprising a smectic liquid crystal film which is sensitive to infra-red radiation and which is positioned so that infra-red radiation emanating from a remote infra-red source impinges on said liquid crystal film to create a thermal image, wherein at least one of two major surfaces of said liquid crystal film is unsupported.

11. An imaging device according to claim 10 which is arranged so that incident infra-red radiation from said remote infra-red source impinges directly on said at least one unsupported major surface of said liquid crystal film.

12. An imaging device according to claim 10 wherein said liquid crystal film is supported in a shallow recess in a block of thermally insulating material.

13. An imaging device according to claim 12 wherein the shallow recess is 6–10 μm deep.

14. An imaging device according to claim 10 further comprising readout means for forming an optical image of the thermal image formed on said liquid crystal film.

15. An imaging device according to claim 14 wherein the readout means comprises means for illuminating said liquid crystal film with polarised light, said liquid crystal film changing the polarizaton state of said polarised light in response to temperature.

16. An imaging device according to claim 14 further comprising enhancement means for causing a read beam to pass through said liquid crystal film several times so as to enhance the image obtained.

17. An imaging device according to claim 16 wherein the enhancement means comprises first and second members which are at least partially reflective, one member being mounted on one side of said liquid crystal film and the other member being mounted on a side opposite said one side of said liquid crystal film.

18. An imaging device according to claim 10 further comprising an iris positioned in front of said liquid crystal film.

19. An imaging device according to claim 10 further comprising a reticulated structure supporting a plurality of said liquid crystal films by surface tension effects.

20. A thermal imager having a sensitive element including a free-standing liquid crystal film, said liquid crystal film being supported by surface tension effects in a reticulted structure so as to provide a large image area.

21. An imaging device according to claim 10 wherein both of the major surfaces of the liquidcrystal film are unsupported.

* * * * *